US012468242B2

(12) United States Patent
Shibuya

(10) Patent No.: US 12,468,242 B2
(45) Date of Patent: Nov. 11, 2025

(54) IMAGE FORMING APPARATUS

(71) Applicant: KYOCERA Document Solutions Inc., Osaka (JP)

(72) Inventor: Teppei Shibuya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/926,880

(22) Filed: Oct. 25, 2024

(65) Prior Publication Data

US 2025/0147453 A1 May 8, 2025

(30) Foreign Application Priority Data

Nov. 2, 2023 (JP) ................................. 2023-188693

(51) Int. Cl.

*G03G 15/02* (2006.01)
*G03G 15/00* (2006.01)
*G03G 15/16* (2006.01)

(52) U.S. Cl.

CPC ..... *G03G 15/1685* (2013.01); *G03G 15/1615* (2013.01); *G03G 15/5058* (2013.01); *G03G 15/55* (2013.01)

(58) Field of Classification Search

CPC . G03G 15/1615; G03G 15/5058; G03G 15/55
USPC .......................................... 399/31, 302, 308
See application file for complete search history.

(56) References Cited

FOREIGN PATENT DOCUMENTS

| | | | |
|---|---|---|---|
| JP | 2009223285 | * | 10/2009 |
| JP | 2014-059336 A | | 4/2014 |

* cited by examiner

*Primary Examiner* — Hoan H Tran
(74) *Attorney, Agent, or Firm* — Stein IP, LLC

(57) ABSTRACT

When the dimension of a primary transfer roller in the width direction is represented by Wa, the dimension of a counter-sensor member in the width direction is represented by Wb, the dimension of an intermediate transfer belt in the width direction is represented by Wc, and the maximum dimension of a sheet in the width direction is represented by Wd, then the relationship $Wd \leq Wa < Wb \leq Wc$ is fulfilled. The transfer position of a test pattern image is a position a predetermined distance away, inward in the width direction, from the edge of the intermediate transfer belt in the width direction. The predetermined distance is twice or more the distance in the width direction from the edge of the intermediate transfer belt in the width direction to the edge of the primary transfer roller in the width direction.

3 Claims, 10 Drawing Sheets

IMAGE FORMING APPARATUS

INCORPORATION BY REFERENCE

This application is based on and claims the benefit of priority from Japanese Patent Application No. 2023-188693 filed on Nov. 2, 2023, the contents of which are hereby incorporated by reference.

BACKGROUND

The present disclosure relates to an image forming apparatus.

An image forming apparatus is provided with an intermediate transfer belt. The intermediate transfer belt rotates while carrying an image formed with toner, to transfer the image to a sheet.

SUMMARY

According to one aspect of the present disclosure, an image forming apparatus includes an image forming section, an endless intermediate transfer belt, a primary transfer roller, a secondary transfer roller, an image density sensor, and a counter-sensor member. The image forming section has an image carrying member, and makes the image carrying member carry an image formed with toner. The intermediate transfer belt has an outer circumferential surface to which the image is primarily transferred, and rotates while carrying the transferred image. The primary transfer roller is rotatable about an axis extending in the width direction orthogonal to the rotation direction of the intermediate transfer belt, is located inward, in the width direction, of an edge of the intermediate transfer belt in the width direction, and is kept in pressed contact with the image carrying member across the intermediate transfer belt. The secondary transfer roller is rotatable about an axis extending in the width direction, forms a transfer nip with the outer circumferential surface of the intermediate transfer belt, and secondarily transfers the image to a sheet passing through the transfer nip. The image density sensor is disposed at a distance from the outer circumferential surface of the intermediate transfer belt, and shines light to the intermediate transfer belt to output a value corresponding to the amount of light reflected from the intermediate transfer belt. The counter-sensor member is disposed at the inner circumference side of the intermediate transfer belt, extends in the width direction so as to cross a position facing the image density sensor, and makes contact with the inner circumferential surface of the intermediate transfer belt. When calibration is performed with respect to formation of the image, the image forming section, while primarily transferring to a transfer region on the intermediate transfer belt a print image to be secondarily transferred to the sheet, primarily transfers to a region outward, in the width direction, of the transfer region a test pattern image to be taken as the target of the sensing by the image density sensor. When the dimension of the primary transfer roller in the width direction is represented by Wa, the dimension of the counter-sensor member in the width direction is represented by Wb, the dimension of the intermediate transfer belt in the width direction is represented by Wc, and the maximum dimension of the sheet in the width direction is represented by Wd, then the relationship $Wd \leq Wa < Wb \leq Wc$ or the relationship $Wd \leq Wa < Wc \leq Wb$ is fulfilled. The transfer position of the test pattern image is a position a predetermined distance away, inward in the width direction, from the edge of the intermediate transfer belt in the width direction. The predetermined distance is twice or more the distance in the width direction from the edge of the intermediate transfer belt in the width direction to an edge of the primary transfer roller in the width direction.

DETAILED DESCRIPTION

One embodiment of the present disclosure will be described below taking as an example a tandem-type color laser printer. The present disclosure is applicable not only to printers but also to multifunction peripherals furnished with a copying function and the like.

Figure 1:
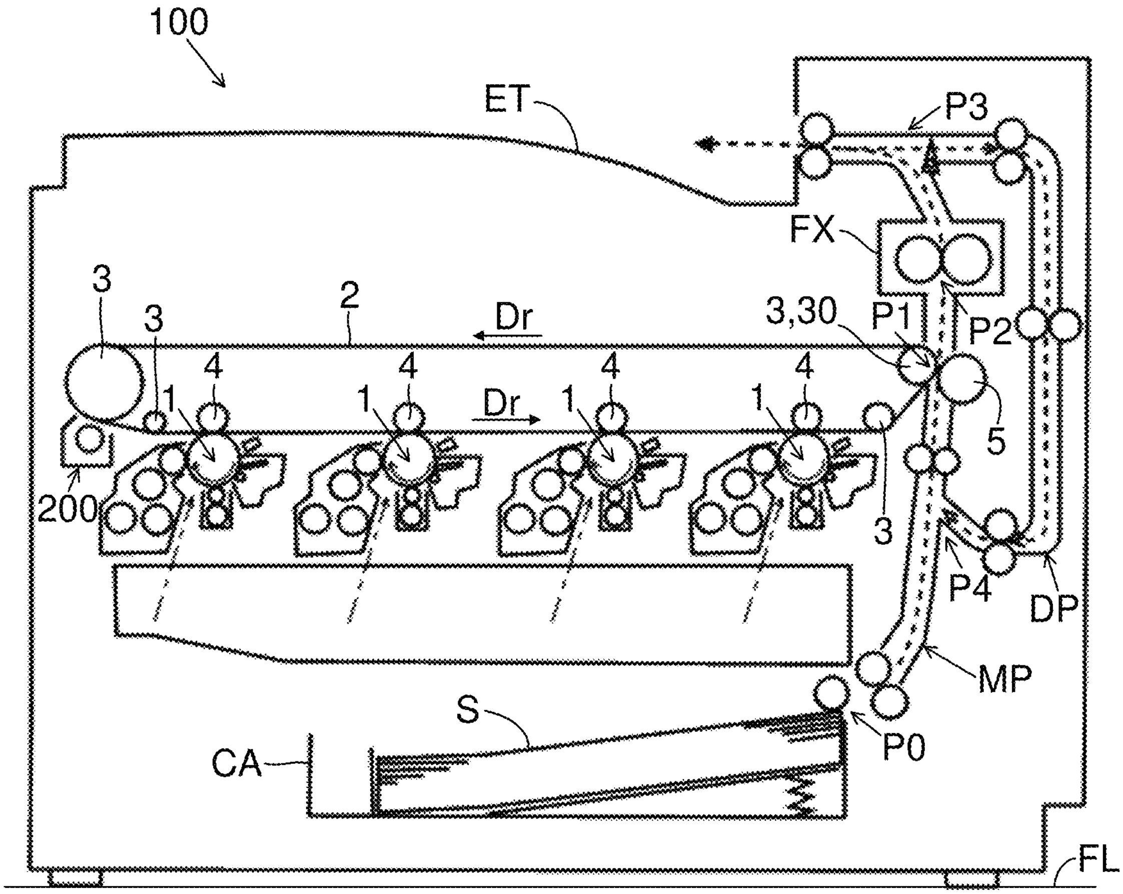
FIG. 1 is a schematic diagram of an image forming apparatus according to an embodiment.

Construction of an Image Forming Apparatus: FIG. 1 shows the construction of an image forming apparatus 100 according to the embodiment. The image forming apparatus 100 is installed on a flat floor surface FL. The top-bottom direction of the image forming apparatus 100 is perpendicular to the floor surface FL.

The image forming apparatus 100 includes a main conveyance passage MP. The image forming apparatus 100 also includes a sheet cassette CA. The sheet cassette CA is removably mounted in the body of the image forming apparatus 100. The sheet cassette CA stores sheets S to be used in a print job. The main conveyance passage MP leads from a feed position P0, at which a sheet S is fed into it from the sheet cassette CA, via a transfer position P1 and a fixing position P2 to a discharge tray ET.

In a print job, a sheet S in the sheet cassette CA is fed, at the feed position P0, into the main conveyance passage MP. The sheet S is conveyed along the main conveyance passage MP. Meanwhile, an image is formed with toner. The image is then printed on the sheet S being conveyed. In other words, the transferring of the image to the sheet S being conveyed is carried out at the transfer position P1. At the fixing position P2, the fixing of the image to the sheet S is carried out.

The image forming apparatus 100 includes an image forming section 1, and here specifically includes four image forming sections 1. The four image forming sections 1 correspond to different colors, specifically cyan, magenta, yellow, and black respectively. The four image forming sections 1 form images using toner of the corresponding colors respectively. The four image forming sections 1 are configured similarly and accordingly the following description focuses on one particular image forming section 1; for the other image forming sections 1 the following description is to be referred to and no separate description will be given.

Figure 2:
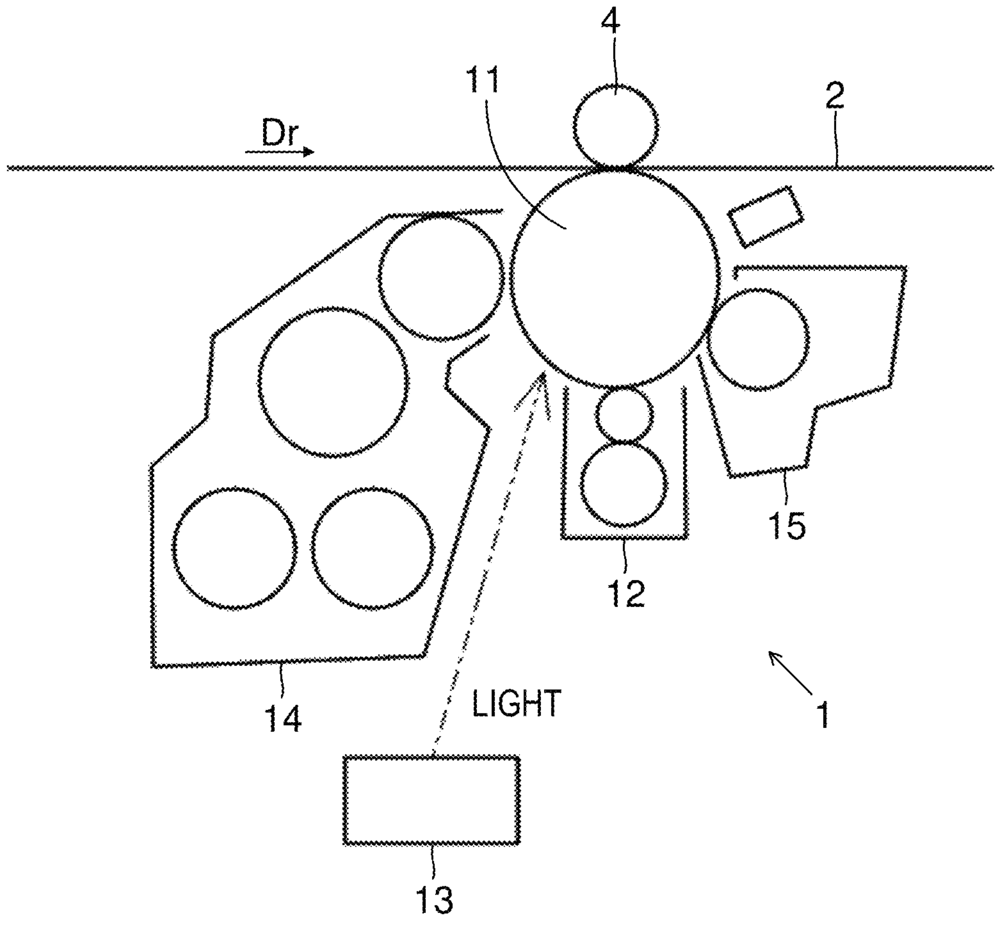
FIG. 2 is a schematic diagram of an image forming section according to the embodiment.

The details of the image forming section 1 is shown in FIG. 2. The image forming section 1 includes a photosensitive drum 11. The photosensitive drum 11 corresponds to an image carrying member. The photosensitive drum 11 is supported so as to be rotatable about an axis extending in one direction (the direction perpendicular to the plane of FIG. 2). In the image forming section 1, an image formed with toner is carried on the outer circumferential surface of the photosensitive drum 11. The photosensitive drum 11 rotates while carrying the toner image on its outer circumferential surface.

The image forming section 1 further includes a charging device 12, an exposure device 13, a developing device 14, and a cleaning device 15. During image formation by the image forming section 1, the photosensitive drum 11 rotates. The charging device 12 electrostatically charges the outer circumferential surface of the photosensitive drum 11. The exposure device 13 exposes to light the outer circumferential surface of the photosensitive drum 11 to form an electrostatic latent image on the outer circumferential surface of the photosensitive drum 11. The developing device 14 feeds toner to the outer circumferential surface of the photosensitive drum 11 to develop the electrostatic latent image into a toner image. The toner image on the outer circumferential surface of the photosensitive drum 11 is primarily transferred to an intermediate transfer belt 2, which will be described later. The cleaning device 15 removes the toner that remains on the outer circumferential surface of the photosensitive drum 11 without being transferred to the intermediate transfer belt 2.

As shown in FIG. 1, the image forming apparatus 100 includes an intermediate transfer belt 2. The intermediate transfer belt 2 is an endless belt. The intermediate transfer belt 2 is rotatably supported. The intermediate transfer belt 2 is one component of an intermediate transfer unit.

In the following description, the rotation direction of the intermediate transfer belt 2 is referred to as the belt rotation direction and is identified by the reference sign "Dr." A direction orthogonal to the belt rotation direction Dr is referred to as the width direction and is identified by the reference sign "Dw." The width direction Dw is orthogonal to the top-bottom direction of the image forming apparatus 100 (i.e., it is a horizontal direction). The width direction Dw corresponds to the main scanning direction and the belt rotation direction Dr corresponds to the sub (subsidiary) scanning direction. In FIGS. 1 and 2, the width direction Dw is perpendicular to the plane of the figure.

The intermediate transfer belt 2 includes a base layer and a rubber layer (i.e., elastic layer) on top of the base layer. The base layer can be formed of a material having electrical conductivity obtained by mixing polyimide or PVDF (polyvinylidene fluoride) with a electrically conductive material such as an ionic conductive material or a conductive carbon. The rubber layer can be formed of hydrin rubber, chloroprene rubber, or polyurethane rubber. The rubber layer can be protected with a coat layer on top of it. The coat layer can be formed of acrylic resin, silicone, or fluororesin.

The image forming apparatus 100 includes, as one component of the intermediate transfer unit, a plurality of stretching rollers 3. The plurality of stretching rollers 3 are supported so as to be rotatable about axes extending in the width direction Dw. The plurality of stretching rollers 3 are disposed at the inner circumference side of the intermediate transfer belt 2. The plurality of stretching rollers 3 lie in contact with the inner circumferential surface of the intermediate transfer belt 2. Around the plurality of stretching rollers 3 the intermediate transfer belt 2 is rotatably stretched. The number of stretching rollers 3 provided is not subject to any particular limitation and can be modified as necessary according to, for example, the size of the intermediate transfer belt 2.

Figure 4:
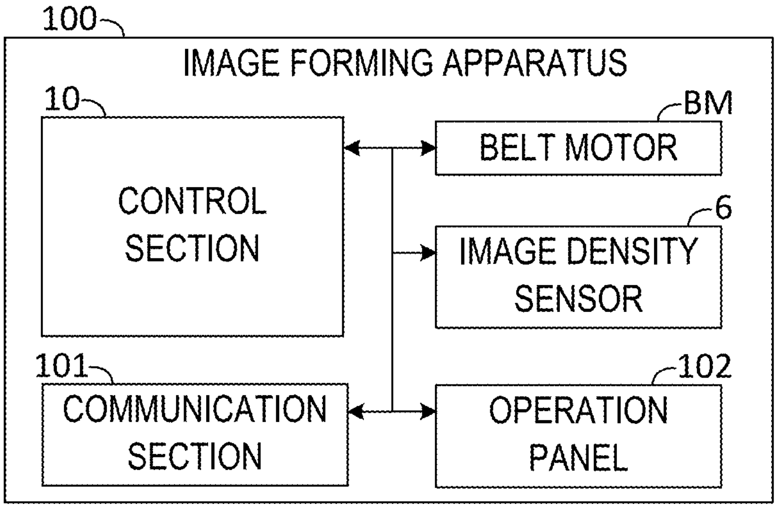
FIG. 4 is a block diagram of the image forming apparatus according to the embodiment.

One of the plurality of stretching rollers 3 is coupled to a belt motor BM (see FIG. 4). In the following description, the stretching roller 3 coupled to the belt motor BM is referred to as the driving roller and is identified by the reference sign "30." The driving roller 30 rotates by being fed with a driving force from the belt motor BM. As the driving roller 30 rotates, the intermediate transfer belt 2 rotates by following it. The other stretching rollers 3 rotate by following the intermediate transfer belt 2.

The image forming apparatus 100 includes, as one component of the intermediate transfer unit, a primary transfer roller 4, and here specifically includes four primary transfer rollers 4. The primary transfer rollers 4 are assigned one for each of the different colors of cyan, magenta, yellow, and black. Each primary transfer roller 4 is disposed at the inner circumference side of the intermediate transfer belt 2. Each primary transfer roller 4 is disposed to face, across the intermediate transfer belt 2, the photosensitive drum 11 that carries the image of the corresponding color. Each primary transfer roller 4 stays in pressed contact, across the intermediate transfer belt 2, with the photosensitive drum 11 that carries the image of the corresponding color.

Figure 3:
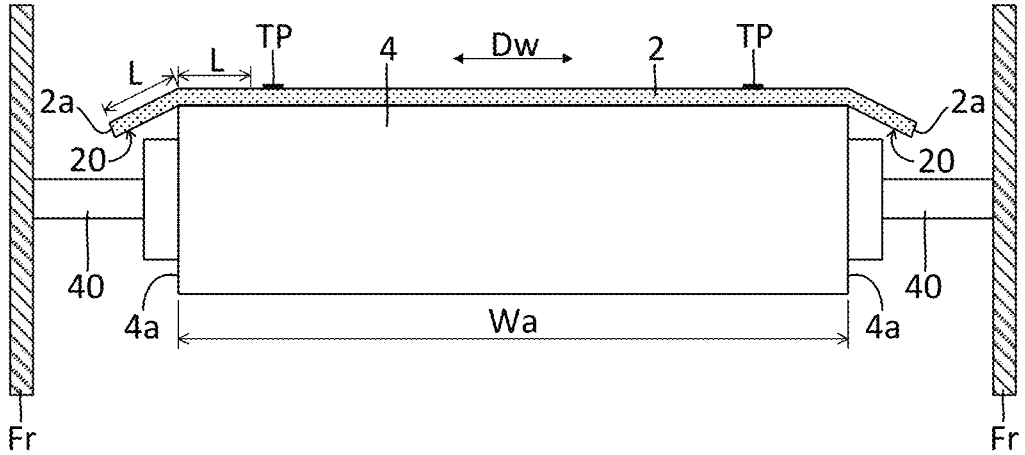
FIG. 3 is a diagram schematically showing a primary transfer roller with its surroundings according to the embodiment.

As shown in FIG. 3, each primary transfer roller 4 is located inward, in the width direction Dw, of the edges 2*a* of the intermediate transfer belt 2 in the width direction Dw. Of the opposite edges 4*a* of each primary transfer roller 4 in the width direction Dw, the edge 4*a* at one side is located inward, in the width direction Dw, of the edge 2*a* of the intermediate transfer belt 2 at one side in the width direction Dw and the edge 4*a* at the other side is located inward, in the width direction Dw, of the edge 2*a* of the intermediate transfer belt 2 at the other side in the width direction Dw. Each primary transfer roller 4 makes contact with the inner circumferential surface of the intermediate transfer belt 2 between the opposite edges 2*a* of the intermediate transfer belt 2 in the width direction Dw.

Each primary transfer roller 4 is supported at the inner circumference side of the intermediate transfer belt 2 so as to be rotatable about an axis extending in the width direction Dw. For example, the image forming apparatus 100 includes, as one component of the intermediate transfer unit, a pair of unit frames Fr. The pair of unit frames Fr face each other in the width direction Dw across the intermediate transfer belt 2. The pair of unit frames Fr rotatably support one and the other end, respectively, of rotation shafts 40. The rotation shafts 40 are assigned one to each of the primary transfer rollers 4. Each primary transfer roller 4 is fitted to the corresponding rotation shaft 40. Each primary transfer roller 4 rotates together with the corresponding rotation shaft 40.

Note that FIG. 3 shows the primary transfer roller 4 with its surroundings on a section across a plane parallel to the width direction Dw. FIG. 3 only schematically shows the primary transfer roller 4 with its surroundings and does not exactly reflect the actual dimensions, shapes, and the like.

With reference back to FIG. 1, the image forming apparatus 100 includes a secondary transfer roller 5. The secondary transfer roller 5 is supported so as to be rotatable about an axis extending in the width direction Dw. The secondary transfer roller 5 lies, at a transfer position P1, in pressed contact with the outer circumferential surface of the intermediate transfer belt 2. The secondary transfer roller 5 grips the intermediate transfer belt 2 against the driving roller 30 to form a transfer nip with the outer circumferential surface of the intermediate transfer belt 2. Thus, the transfer nip is formed at the transfer position P1. The main conveyance passage MP passes through the transfer nip.

In a print job, a sheet S is conveyed toward the transfer position P1 (i.e., the transfer nip). The sheet S being conveyed passes through the transfer nip. Thus the intermediate transfer belt 2 makes contact with the sheet S being conveyed downstream, in the rotation direction Dr, of the positions of contact with the photosensitive drums 11.

Each image forming section 1 forms an image with toner of the corresponding color. Each primary transfer roller 4 primarily transfers the image to the outer circumferential surface of the intermediate transfer belt 2.

The intermediate transfer belt 2 rotates while carrying on its outer circumferential surface the images primarily transferred from the photosensitive drums 11. While the sheet S is passing through the transfer nip, the sheet S makes contact with the outer circumferential surface of the intermediate transfer belt 2. The secondary transfer roller 5 is fed with a transfer voltage from a transfer voltage power supply (not illustrated). The secondary transfer roller 5 forms a transfer electric field between itself and the intermediate transfer belt 2 to secondarily transfer the images to the sheet S passing through the transfer nip.

The image forming apparatus 100 incudes a cleaning section 200. The cleaning section 200 faces the outer circumferential surface of the intermediate transfer belt 2 downstream of the transfer position P1 in the belt rotation direction Dr. The cleaning section 200 cleans the outer circumferential surface of the intermediate transfer belt 2.

The image forming apparatus 100 includes a fixing section FX. The fixing section FX includes a heating roller and a pressing roller. The fixing section FX is disposed at the fixing position P2. The heating roller incorporates a heater. The pressing roller lies in pressed contact with the heating roller. The heating roller and the pressing roller are kept in pressed contact with each other to form a fixing nip at the fixing position P2.

In a print job, a sheet S passes at the fixing position P2. That is, the sheet S is gripped in the fixing nip. The fixing section FX heats the sheet S passing at the fixing position P2. At the fixing position P2, the sheet S is pressed. The fixing section FX heats and presses the sheet S to fix the toner image to the sheet S. The sheet S having undergone fixing is discharged into a discharge tray ET.

The image forming apparatus 100 includes a conveyance section, though with no reference sign assigned to it. The conveyance section includes paired conveyance rollers. The paired conveyance rollers include a pair of rollers. The pair of rollers has a conveyance nip between the rollers. The paired conveyance rollers rotate and thereby convey a sheet S that has entered the conveyance nip. The conveyance section conveys the sheet S along the main conveyance passage MP. The conveyance section conveys the sheet S also along a duplex printing conveyance passage DP, which will be described later.

The image forming apparatus 100 can perform a simplex printing job, in which an image is printed only on one side of a sheet S, or a duplex printing job, in which images are printed on both sides of a sheet S. For duplex printing jobs, the image forming apparatus 100 includes a duplex printing conveyance passage DP.

The duplex printing conveyance passage DP branches off the main conveyance passage MP at a branch position P3 on it downstream of the intermediate transfer belt 2 in the sheet conveyance direction. The duplex printing conveyance passage DP joins the main conveyance passage MP back at a junction position P4 on it upstream of the transfer position P1 in the sheet conveyance direction.

If the job being performed is a simplex printing job, the sheet S passes through the transfer nip only once and the sheet S passing through the transfer nip undergoes image transfer only once. Having undergone the first-time image transfer the sheet S is as it is discharged into the discharge tray ET.

If the job being performed is a duplex printing job, the sheet S has to undergo image transfer once for each of its obverse and reverse sides and thus the sheet S passes through the transfer nip twice. Specifically, when the sheet S passes through the transfer nip for the first time, it undergoes image transfer on one side. After the first-time image transfer, after the trailing end of the sheet S has left the branch position P3, before the sheet S is completely discharged into the discharge tray ET, the sheet S is switched back. The sheet S is then, starting at its trailing end, pulled into the duplex printing conveyance passage DP.

The sheet S is then conveyed along the duplex printing conveyance passage DP. The sheet S in the duplex printing conveyance passage DP is then returned, at the junction position P4, into the main conveyance passage MP. The sheet S having returned to the main conveyance passage MP is conveyed along the main conveyance passage MP and passes through the transfer nip again. This time, the sheet S has its obverse and reverse sides reversed compared with when it passed through the transfer nip last time. Thus, when the sheet S passes through the transfer nip for the second time, it undergoes image transfer on its other side opposite from its one side.

As shown in FIG. 4, the image forming apparatus 100 includes a control section 10. The control section 10 includes processing circuits such as a CPU and an ASIC. The control section 10 also includes storage devices such as a ROM and a RAM. The control section 10 controls print jobs performed on the image forming apparatus 100. The control section 10 controls the belt motor BM to rotate the intermediate transfer belt 2 appropriately.

The image forming apparatus 100 includes a communication section 101. The communication section 101 includes a communication circuit, a communication memory, a communication connector, and the like. The communication section 101 is connected to, so as to be able to communicate with, an external device across a network such as a LAN. The external device can be a user terminal. The user terminal can be a personal computer (PC), a smartphone, a tablet computer, or the like.

Via the communication section 101 the control section 10 communicates with the external device. For example, the external device (user terminal) transmits print data for a print job to the image forming apparatus 100. The print data contains, among others, the data of an image to be printed in a print job. Based on the print data the control section 10 controls the print job.

The image forming apparatus 100 includes an operation panel 102. The operation panel 102 includes a touch screen. The operation panel 102 accepts settings and instructions from a user. The operation panel 102 is connected to the control section 10. The control section 10 recognizes the settings and instructions that the operation panel 102 has accepted from the user.

The image forming apparatus 100 includes an image density sensor 6. The image density sensor 6 is used to sense the density and position of the image transferred to the outer circumferential surface of the intermediate transfer belt 2. The image density sensor 6 is connected to the control section 10. The control section 10 is fed with the output value of the image density sensor 6.

The image density sensor 6 is disposed at a distance from the outer circumferential surface of the intermediate transfer belt 2. The image density sensor 6 is a reflection optical sensor and has a light-emitting segment and a light-receiving segment. The image density sensor 6 shines light to the outer circumferential surface of the intermediate transfer belt 2 and outputs a value corresponding to the amount of light reflected from the outer circumferential surface (specifically, a test region 22, which will be described later) of the intermediate transfer belt 2. The image density sensor 6 varies its output value according to whether an image is present at its sensing position or not. The image density sensor 6 varies its output value also according to the density of the image present at its sensing position. The sensing position of the image density sensor 6 is a position on the intermediate transfer belt 2 that faces the image density sensor 6 and to which the image density sensor 6 shines light.

Figure 5:
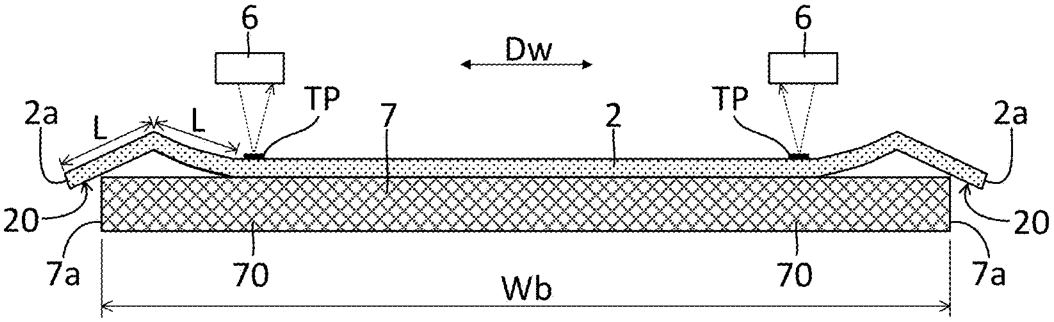
FIG. 5 diagram schematically showing a counter-sensor member with its surroundings according to the embodiment.

Here, as shown in FIG. 5, the image forming apparatus 100 includes a counter-sensor member 7. The counter-sensor member 7 is disposed at the inner circumference side of the intermediate transfer belt 2. The counter-sensor member 7 assists sensing with the image density sensor 6 by suppressing deformation of the intermediate transfer belt 2 at the sensing position of the image density sensor 6. In FIG. 5, the light emitted from the image density sensor 6 (and its reflection) is indicated by broken-line arrows. This applies also to FIG. 7, which will be referred to later.

Note that FIG. 5 shows the counter-sensor member 7 with its surroundings on a section across a plane parallel to the width direction Dw. FIG. 5 only schematically shows the counter-sensor member 7 with its surroundings and does not exactly reflect the actual dimensions, shapes, and the like.

For example, the counter-sensor member 7 is a roller and is supported so as to be rotatable about an axis extending in the width direction Dw. The roller as the counter-sensor member 7 can be configured similarly to the stretching rollers 3. In other words, the counter-sensor member 7 can be used as a stretching roller 3. In yet other words, a plurality of stretching rollers 3 can be used as the counter-sensor member 7.

The counter-sensor member 7 can be configured as a member different from a roller. For example, the counter-sensor member 7 can be a sheet-metal member. In that case, the sheet-metal member as the counter-sensor member 7 is stretched from one to the other of the pair of unit frames Fr so as to lie in contact with the inner circumferential surface of the intermediate transfer belt 2. To reduce the friction resistance against the intermediate transfer belt 2 and to drain static electricity, the sheet-metal member can be laid with an electrically conductive sheet (e.g., a non-woven fabric), with the electrically conductive sheet kept in contact with the inner circumferential surface of the intermediate transfer belt 2.

The counter-sensor member 7 is disposed such that a part of it faces the image density sensor 6 across the intermediate transfer belt 2. In other words, the counter-sensor member 7 extends in the width direction Dw so as to cross a position that faces the image density sensor 6 across the intermediate transfer belt 2. In yet other words, the counter-sensor member 7 has a counter portion 70 that faces the image density sensor 6 across the intermediate transfer belt 2.

Owing to the provision of the counter-sensor member 7, the intermediate transfer belt 2 is, at the sensing position of the image density sensor 6, supported by the counter portion 70. This helps suppress deformation, such as sagging, of the intermediate transfer belt 2 at the sensing position of the image density sensor 6.

The image density sensor 6 is used in calibration, which will be described later. For accurate calibration the sensing by the image density sensor 6 has to be accurate. It is therefore preferable to suppress deformation of the intermediate transfer belt 2 at the sensing position of the image density sensor 6.

Outline of Calibration: The control section 10 performs calibration with respect to image formation by the image forming section 1 to maintain a certain level of quality in the output image. In calibration the control section 10 corrects density and color displacements in the output image. To that end the control section 10 senses, based on the output value of the image density sensor 6, the density of the image transferred to the outer circumferential surface of the intermediate transfer belt 2; the control section 10 also senses, based on the output value of the image density sensor 6, the position (in other words, displacement) of the image transferred to the outer circumferential surface of the intermediate transfer belt 2.

For calibration the control section 10 makes each image forming section 1 form a test pattern image TP for use in calibration. Each image forming section 1 forms the test pattern image TP with toner and primarily transfers it to the intermediate transfer belt 2. The test pattern image TP is taken as the target of the sensing by the image density sensor 6. Accordingly, for accurate calibration the density of the test pattern image TP needs to be sensed accurately.

The test pattern image TP is not printed on a sheet S. The test pattern image TP can comprise, for example, an image for use in density correction and an image for use in color displacement correction. In the diagrams, test pattern images TP are indicated as solid black regions.

For density correction the control section 10 makes each image forming section 1 form a test pattern image TP for use in density correction. For example, the image forming section 1 forms, as the test pattern image TP for use in density correction, a plurality of patches with varying densities and secondarily transfers these to the intermediate transfer belt 2. Based on the output value of the image density sensor 6 the control section 10 acquires a plurality of patch densities for different colors. If an acquired density is lower than the target density, the control section 10 makes such a correction as to increase the density of the print image; if an acquired density is higher than the target density, the control section 10 makes such a correction as to reduce the density of the print image. For density correction, a developing bias or a transferring bias can be corrected.

For color displacement correction the control section 10 makes each image forming section 1 form a test pattern image TP for use in color displacement correction. For example, the image forming section 1 forms, as the test pattern image TP for use in color displacement correction in the main scanning direction, lines inclined at 45° relative to the main scanning direction and transfer them to the intermediate transfer belt 2. Likewise, the image forming section 1 forms, as the test pattern image TP for use in color displacement correction in the sub scanning direction, lines parallel to the main scanning direction and transfer them to the intermediate transfer belt 2. Based on the output value of the image density sensor 6 the control section 10 senses the intervals between the lines of different colors. The control section 10 corrects the exposure start position so as to make the intervals between the lines of different colors equal to a target interval.

Figure 6:
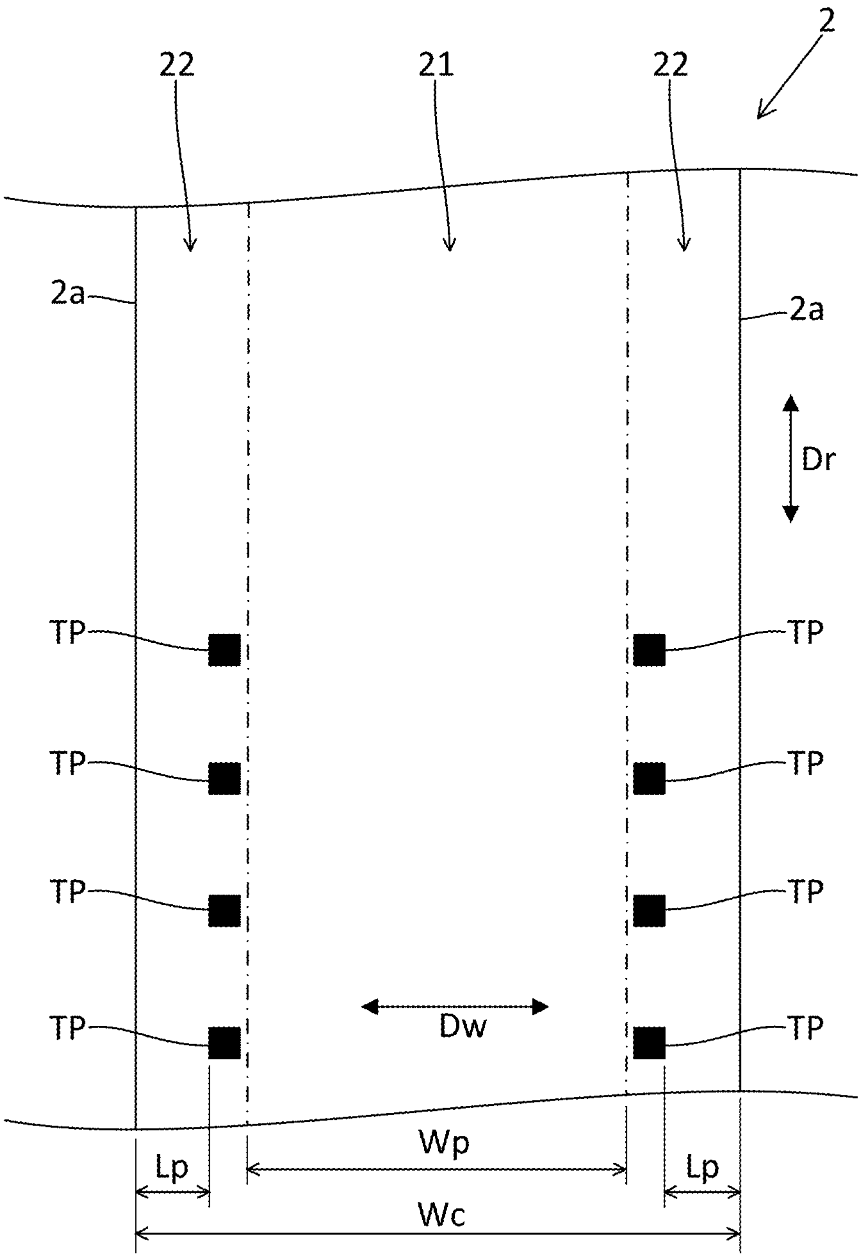
FIG. 6 is a diagram showing the positions of a printing region and a test region on an intermediate transfer belt according to the embodiment.

Transfer Positions of Test Pattern Images: As shown in FIG. 6, the intermediate transfer belt 2 has a printing region 21 and a test region 22. In other words, the outer circumferential surface of the intermediate transfer belt 2 divides into a printing region 21 and a test region 22. In FIG. 6, for clear distinction between the printing region 21 and the test region 22, the boundaries between them are indicated by dash-and-dot lines. FIG. 6 is a plan view of the intermediate transfer belt 2 as seen in its thickness direction.

Of the intermediate transfer belt 2, a region between opposite end parts in the width direction Dw is the printing region 21. Of the intermediate transfer belt 2, the opposite end parts in the width direction Dw are the test region 22. In other words, the region located between a pair of test regions 22 in the width direction Dw is the printing region 21. In yet other words, the regions on opposite sides of the printing region 21 in the width direction Dw (i.e., the regions outward of the printing region 21 in the width direction Dw) are each a test region 22. The printing region 21 corresponding to a "transfer region." The test regions 22 correspond to a "region outward of the transfer region in the width direction."

Each image forming section 1 forms a print image with toner and primarily transfers the print image to the printing region 21. The print image is an image to be secondarily transferred to a sheet S. Each image forming section 1 also forms a test pattern image TP with toner and primarily transfers it to the test region 22. For calibration each image forming section 1 primarily transfers the print image to the printing region 21 and at the same time primarily transfers the test pattern image TP to the test region 22. Thus calibration can be performed concurrently with a print job without inviting a drop in productivity. In a case where calibration alone is performed, the test pattern image TP can be transferred not only to the test region 22 but also to the printing region 21.

Here, the primary transfer roller 4, the counter-sensor member 7, the intermediate transfer belt 2, and the sheet S are aligned with each other at their middle in the width direction Dw. Moreover, when the dimension of the primary transfer roller 4 in the width direction Dw is represented by Wa (see FIG. 3), the dimension of the counter-sensor member 7 in the width direction Dw is represented by Wb (see FIG. 5), the dimension of the intermediate transfer belt 2 in the width direction Dw is represented by Wc (see FIG. 6), and the maximum dimension of the sheet S in the width direction Dw (in other words, the dimension in the width direction Dw of the largest sheet S usable on the image forming apparatus 100) is represented by Wd, these are determined so as to fulfill the relationship $Wd \leq Wa < Wb \leq Wc$.

While in the diagram being referred to the design is such that $Wb < Wc$ for convenience' sake, it can instead be such that $Wb = Wc$. Though not illustrated, a design that fulfills $Wd \leq Wa < Wc \leq Wb$ is also possible. In the diagram being referred to, for simple illustration, the dimension Wd of the sheet S in the width direction Dw is not shown. For example, the dimension Wd of the sheet S in the width direction Dw can be equal to the dimension Wp of the printing region 21 in the width direction Dw.

Since the intermediate transfer belt 2 is larger than the primary transfer roller 4 in the width direction Dw, end parts of the intermediate transfer belt 2 in the width direction Dw lie outward, in the width direction Dw, beyond the primary transfer roller 4. Thus, the end parts of the intermediate transfer belt 2 in the width direction Dw are pressed with higher pressure than the other part of it from the inner circumference side to the outer circumference side. As a result, as shown in FIG. 3, the end parts of the intermediate transfer belt 2 in the width direction Dw deform. For example, the end parts of the intermediate transfer belt 2 in the width direction Dw bend toward the inner circumference side of the intermediate transfer belt 2. The intermediate transfer belt 2 tends to bend starting at where it makes contact with the edges 4*a* of the primary transfer roller 4 in the width direction Dw. In the following description, the end parts of the intermediate transfer belt 2 in the width direction Dw are identified by the reference sign "20" and are referred to as the deformed belt parts 20.

Moreover, since the counter-sensor member 7 is larger than the primary transfer roller 4 in the width direction Dw, the edges 7*a* of the counter-sensor member 7 in the width direction Dw protrude outward, in the width direction Dw, beyond the edges 4*a* of the primary transfer roller 4 in the width direction Dw. Of the counter-sensor member 7, the edge 7*a* at one side in the width direction Dw protrudes outward, in the width direction Dw, beyond the edge 4*a* of the primary transfer roller 4 at one side in the width direction Dw and the edge 7*a* at the other side in the width direction Dw protrudes outward, in the width direction Dw, beyond the edge 4*a* of the primary transfer roller 4 at the other side in the width direction Dw. Thus, as shown in FIG. 5, the deformed belt parts 20 run on the counter-sensor member 7.

Figure 7:
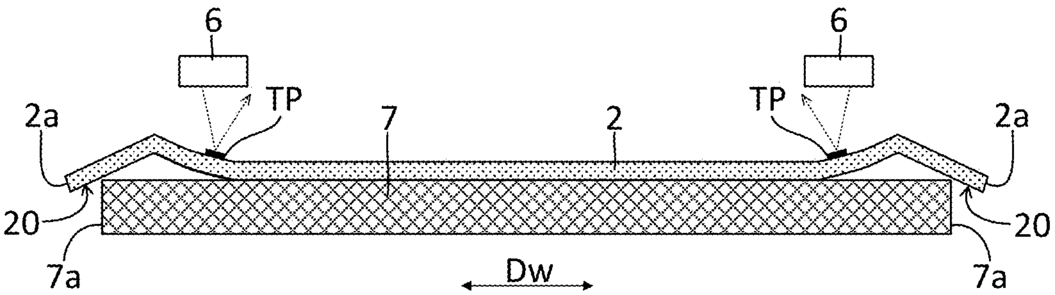
FIG. 7 is a diagram illustrating the inconvenience resulting from a deformed part of the intermediate transfer belt running on a counter-sensor member.

In this construction, suppose that as shown in FIG. 7 the sensing position of the image density sensor 6 is in the deformed belt part 20; in other words, suppose that the transfer position of the test pattern image TP is in the deformed belt part 20. In that case, the deformed belt part 20 runs on the counter-sensor member 7 and the positional relationship between the sensing position of the image density sensor 6 and the transfer position of the test pattern image TP changes. Specifically, the distance from the image density sensor 6 to the test pattern image TP changes. Moreover, the transfer surface for the test pattern image TP becomes greatly inclined relative to the light exit surface of the image density sensor 6 (i.e., the angle changes). These changes in distance and angle between the sensing position of the image density sensor 6 and the transfer position of the test pattern image TP make difficult accurate sensing of the density and position of the transferred test pattern image TP.

To avoid that, in this embodiment the test pattern image TP is primarily transferred at a position at which it is substantially not affected by deformation of the intermediate transfer belt 2.

Specifically, as shown in FIGS. 5 and 6, the transfer position of the test pattern image TP is a position a predetermined distance Lp away, inward in the width direction Dw, from the edges 2*a* of the intermediate transfer belt 2 in the width direction Dw. The predetermined distance Lp is twice or more the distance L in the width direction Dw from the edges 2*a* of the intermediate transfer belt 2 in the width direction Dw to the edges 4*a* of the primary transfer roller 4 in the width direction Dw.

In the embodiment, while regions of the intermediate transfer belt 2 on both sides of the printing region 21 in the width direction Dw are secured as the test region 22, the transfer position of the test pattern image TP is a position the predetermined distance Lp (≥2L) away, inward in the width direction Dw, from the edges 2*a* of the intermediate transfer belt 2 in the width direction Dw. Thus, as shown in FIG. 5, even if end parts of the intermediate transfer belt 2 in the width direction Dw deform, it is possible to suppress changes in distance and angle between the sensing position of the image density sensor 6 and the transfer position of the test pattern image TP. It is thus possible to accurately perform calibration with respect to image formation by the image forming section 1 without a drop in productivity.

Moreover, in the embodiment, the test pattern image TP is primarily transferred to the outer circumferential surface of the intermediate transfer belt 2 at both of a position the predetermined distance Lp away, inward in the width direction Dw from the edge 2*a* at one side in the width direction Dw and a position the predetermined distance Lp away, inward in the width direction Dw from the edge 2*a* at the other side in the width direction Dw (see FIG. 6). Thus the density and position of the transferred test pattern image TP can be checked at each of the opposite side of the intermediate transfer belt 2 in the width direction Dw, and this allow more accurate calibration.

Figure 8:
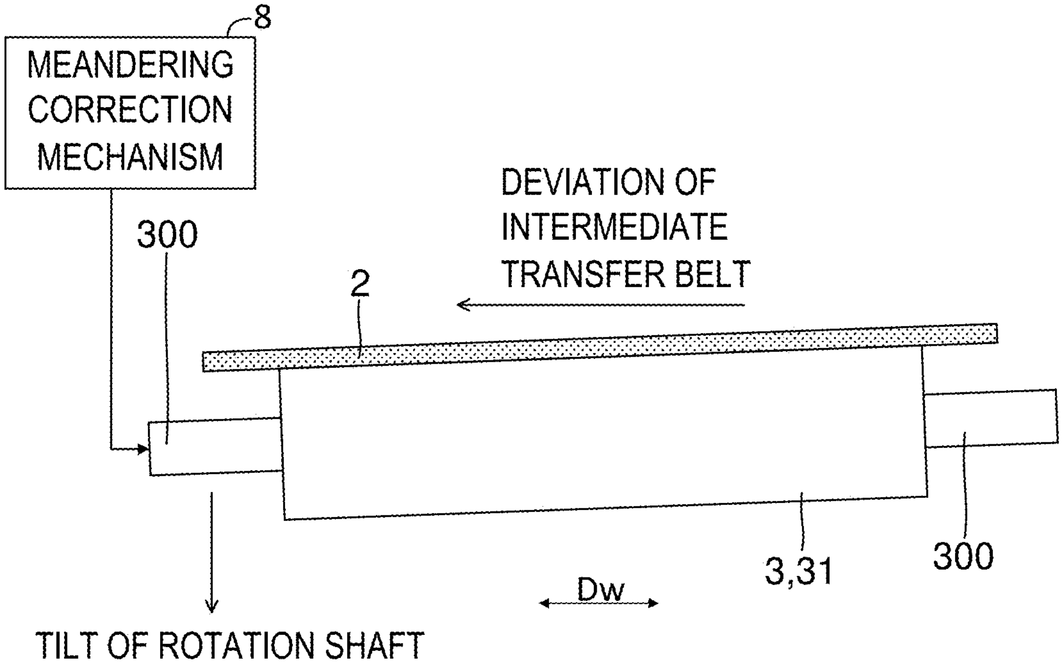
FIG. 8 is a diagram illustrating meandering correction performed by a meandering correction mechanism according to the embodiment.

Meandering Correction for the Intermediate Transfer Belt: As shown in FIG. 8, the image forming apparatus 100 includes a meandering correction mechanism 8. The meandering correction mechanism 8 corrects the meandering of the intermediate transfer belt 2. The meandering correction mechanism 8 is coupled to a correction-target roller 31 among the plurality of stretching rollers 3 and, through the tilting of the rotation shaft 300 of the correction-target roller 31, corrects the meandering of the intermediate transfer belt 2. For example, if the intermediate transfer belt 2 deviates to one side in the width direction Dw (assume here leftward in the diagram), the meandering correction mechanism 8 tilts the rotation shaft 300 of the correction-target roller 31 left-end down.

There is no particular restriction on the structure of the meandering correction mechanism 8. The degree of meandering of the intermediate transfer belt 2 can be sensed so that, based on the result of the sensing, the inclination of the rotation shaft 300 of the correction-target roller 31 can be adjusted (first implementation example). Or the meandering of the intermediate transfer belt 2 can automatically trigger adjustment of the inclination of the rotation shaft 300 of the correction-target roller 31 (second implementation example).

In the first implementation example, though not illustrated, the meandering correction mechanism 8 includes a degree-of-meandering sensor that senses the degree of meandering of the intermediate transfer belt 2. There is no particular restriction on the configuration of the degree-of-meandering sensor. The degree-of-meandering sensor outputs a value corresponding to the edge positions of the intermediate transfer belt 2 in the width direction Dw. The degree-of-meandering sensor can be a transmission optical sensor that has a light-emitting segment and a light-receiving segment that face each other in the top-bottom direction across end parts of the intermediate transfer belt 2 in the width direction Dw. The degree-of-meandering sensor can be a CIS. The control section 10 is fed with the output value from the degree-of-meandering sensor. Based on the output value from the degree-of-meandering sensor the control section 10 senses the degree of meandering of the intermediate transfer belt 2.

In the first implementation example, though not illustrate, the meandering correction mechanism 8 includes a correction motor that is coupled to the rotation shaft 300 of the correction-target roller 31 and a coupling member that couples together the rotation shaft 300 and the correction motor. The coupling member is a gear, a cam, or the like. When the correction motor is driven, end parts of the rotation shaft 300 in its axial direction (i.e., the width direction Dw) move up and down to tilt the rotation shaft 300. The control section 10 controls the correction motor. Based on the degree of meandering of the intermediate transfer belt 2 the control section 10 tilts the rotation shaft 300 of the correction-target roller 31 to correct the meandering of the intermediate transfer belt 2.

Figure 9:
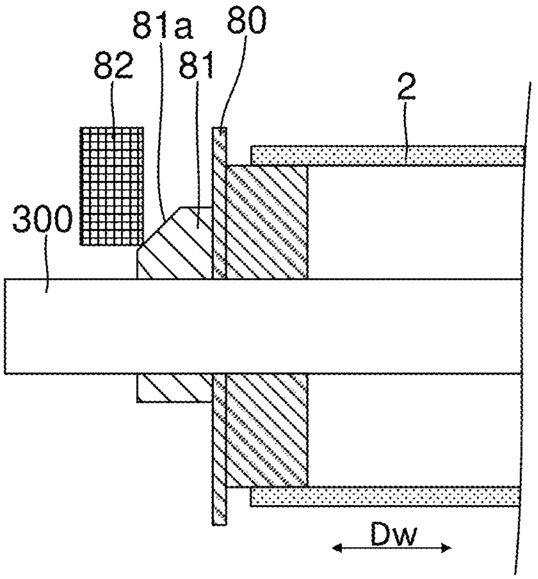
FIG. 9 is a schematic diagram of the meandering correction mechanism according to the embodiment (with no meandering).
Figure 10:
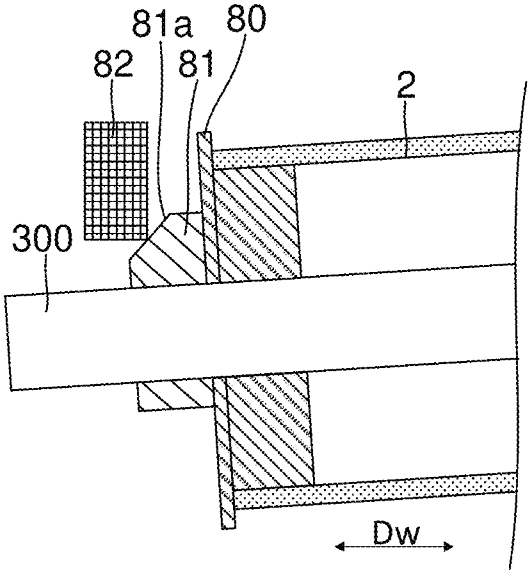
FIG. 10 is a schematic diagram of the meandering correction mechanism according to the embodiment (in the process of correcting meandering).

In the second implementation example, as shown in FIGS. 9 and 10, the rotation shaft 300 of the correction-target roller 31 is rotatably supported on a bearing 81 that has an inclined portion 81*a* on its outer circumference. The bearing 81 is movable in the axial direction of the rotation shaft 300 (i.e., in the width direction Dw). The bearing 81 is disposed outward of a belt guide 80 in the width direction Dw. The inclined portion 81*a* of the bearing 81 is formed so as to incline downward as one goes outward in the width direction Dw. Above the inclined portion 81*a* of the bearing 81, a body guide 82 is disposed. The body guide 82 is fixed to a frame (not illustrated) of the intermediate transfer unit, protrudes down from the body, and abuts on the inclined portion 81*a* of the bearing 81.

In the second implementation example, unless the intermediate transfer belt 2 is meandering the rotation shaft 300 is not tilted (see FIG. 9). If the intermediate transfer belt 2 meanders and it pushes the belt guide 80 to one side in the width direction Dw, together with the belt guide 80 the bearing 81 moves to one side in the width direction Dw (see FIG. 10). At this time, since the inclined portion 81*a* of the bearing 81 abuts on the body guide 82, the rotation shaft 300 is tilted. This corrects the meandering of the intermediate transfer belt 2.

Though not illustrated, a deviation prevention guide can be used to achieve a similar structure. In this structure, a deviation prevention guide is provided in end parts of the intermediate transfer belt 2 in the width direction Dw. Thus, when the intermediate transfer belt 2 moves in the width direction Dw, the deviation prevention guide abuts on the stretching roller 3 and prevents the intermediate transfer belt 2 from moving further in the width direction Dw. With this structure, however, the intermediate transfer belt 2 needs to be made larger in the width direction Dw to secure a position at which to dispose the deviation prevention guide. This results in an increase in the size of the intermediate transfer unit, and hence an increase in the size of the image forming apparatus 100.

On the other hand, with the structure that uses the meandering correction mechanism 8, there is no need to provide the intermediate transfer belt 2 with a deviation prevention guide. It is thus possible to suppress an increase in the size of the image forming apparatus 100.

The embodiment disclosed herein should be understood to be in every sense illustrative and not restrictive. The scope of the present disclosure is defined not by the description of the embodiment given above but by the appended claims and encompasses any modifications made within a scope equivalent in significance to those claims.

What is claimed is:

1. An image forming apparatus comprising:

an image forming section having an image carrying member, the image forming section making the image carrying member carry an image formed with toner;

an intermediate transfer belt being endless and having an outer circumferential surface to which the image is primarily transferred, the intermediate transfer belt rotating while carrying the transferred image;

a primary transfer roller rotatable about an axis extending in a width direction orthogonal to a rotation direction of the intermediate transfer belt, the primary transfer roller being located inward, in the width direction, of an edge of the intermediate transfer belt in the width direction, the primary transfer roller being kept in pressed contact with the image carrying member across the intermediate transfer belt;

a secondary transfer roller rotatable about an axis extending in the width direction, the secondary transfer roller forming a transfer nip with the outer circumferential surface of the intermediate transfer belt, the secondary transfer roller secondarily transferring the image to a sheet passing through the transfer nip;

an image density sensor disposed at a distance from the outer circumferential surface of the intermediate transfer belt, the image density sensor shining light to the intermediate transfer belt to output a value corresponding to an amount of light reflected from the intermediate transfer belt; and a counter-sensor member disposed at an inner circumference side of the intermediate transfer belt, the counter-sensor member extending in the width direction so as to cross a position facing the image density sensor and making contact with the inner circumferential surface of the intermediate transfer belt, wherein when calibration is performed with respect to formation of the image, the image forming section, while primarily transferring to a transfer region on the intermediate transfer belt a print image to be secondarily transferred to the sheet, primarily transfers to a region outward, in the width direction, of the transfer region a test pattern image to be taken as a target of sensing by the image density sensor, when a dimension of the primary transfer roller in the width direction is represented by Wa, a dimension of the counter-sensor member in the width direction is represented by Wb, a dimension of the intermediate transfer belt in the width direction is represented by Wc, and a maximum dimension of the sheet in the width direction is represented by Wd, then a relationship $Wd \leq Wa < Wb \leq Wc$ or a relationship $Wd \leq Wa < Wc \leq Wb$ is fulfilled, a transfer position of the test pattern image is a position a predetermined distance away, inward in the width direction, from the edge of the intermediate transfer belt in the width direction, and the predetermined distance is twice or more a distance in the width direction from the edge of the intermediate transfer belt in the width direction to an edge of the primary transfer roller in the width direction.

2. The image forming apparatus according to claim 1, wherein when the calibration is performed, the image forming section primarily transfers the test pattern image to the outer circumferential surface of the intermediate transfer belt at both of a position the predetermined distance away, inward in the width direction, from the edge of the intermediate transfer belt at one side in the width direction and a position the predetermined distance away, inward in the width direction, from the edge of the intermediate transfer belt at another side in the width direction.

3. The image forming apparatus according to claim 1, further comprising:

a plurality of stretching rollers around which the intermediate transfer belt is rotatably stretched; and a meandering correction mechanism that corrects meandering of the intermediate transfer belt by tilting a rotation shaft of one of the plurality of stretching rollers.

* * * * *